US011111785B2

(12) United States Patent
Zeng et al.

(10) Patent No.: US 11,111,785 B2
(45) Date of Patent: Sep. 7, 2021

(54) METHOD AND DEVICE FOR ACQUIRING THREE-DIMENSIONAL COORDINATES OF ORE BASED ON MINING PROCESS

(71) Applicant: Wuyi University, Jiangmen (CN)

(72) Inventors: Junying Zeng, Jiangmen (CN); Xuhua Li, Jiangmen (CN); Chuanbo Qin, Jiangmen (CN); Kaitian Wei, Jiangmen (CN); Fan Wang, Jiangmen (CN); Xiaowei Jiang, Jiangmen (CN); Weizhao He, Jiangmen (CN); Junhua He, Jiangmen (CN)

(73) Assignee: Wuyi University, Jiangmen (CN)

( * ) Notice: Subject to any disclaimer, the term of this patent is extended or adjusted under 35 U.S.C. 154(b) by 0 days.

(21) Appl. No.: 16/806,714

(22) Filed: Mar. 2, 2020

(65) Prior Publication Data

US 2021/0062653 A1 Mar. 4, 2021

(30) Foreign Application Priority Data

Sep. 4, 2019 (CN) .......................... 201910831631.0

(51) Int. Cl.
| | |
|---|---|
| *E21C 39/00* | (2006.01) |
| *G01V 8/02* | (2006.01) |
| *G06K 9/00* | (2006.01) |
| *G06K 9/20* | (2006.01) |
| *G06K 9/46* | (2006.01) |
| *G06K 9/62* | (2006.01) |

(52) U.S. Cl.
CPC ................ *E21C 39/00* (2013.01); *G01V 8/02* (2013.01); *G06K 9/00208* (2013.01); *G06K 9/2018* (2013.01); *G06K 9/4604* (2013.01); *G06K 9/4652* (2013.01); *G06K 9/6257* (2013.01); *G06K 2209/21* (2013.01)

(58) Field of Classification Search
None
See application file for complete search history.

(56) References Cited

U.S. PATENT DOCUMENTS

2009/0290758 A1* 11/2009 Ng-Thow-Hing ...... G06T 7/536
382/106
2017/0185226 A1* 6/2017 Matsumura ........... G06F 3/0416

OTHER PUBLICATIONS

Bolya, D., Zhou, C., Xiao, F., & Lee, Y. J. (2019). Yolact: Real-time instance segmentation. In Proceedings of the IEEE/CVF International Conference on Computer Vision (pp. 9157-9166). (Year: 2019).*

* cited by examiner

*Primary Examiner* — David Perlman
(74) *Attorney, Agent, or Firm* — Vivacqua Crane

(57) ABSTRACT

A method and a device for acquiring three-dimensional coordinates of ore based on mining process are disclosed. The method includes: obtaining a two-dimensional coordinate of the ore by using a YOLACT algorithm and a NMS algorithm to obtain a prediction mask map, obtaining depth information of the ore based on the color map and the infrared depth map, and combining the two-dimensional coordinate with the depth information to obtain a three-dimensional coordinate of the ore.

3 Claims, 3 Drawing Sheets

METHOD AND DEVICE FOR ACQUIRING THREE-DIMENSIONAL COORDINATES OF ORE BASED ON MINING PROCESS

CROSS-REFERENCE TO RELATED APPLICATIONS

This application is based on and claims the benefit of priority from Chinese Patent Application No. 2019108316310, filed on 4 Sep. 2019, the entirety of which is incorporated by reference herein.

TECHNICAL FIELD

The present disclosure relates to the technical field of mining, and in particular, to a method and device for acquiring three-dimensional coordinates of ore based on mining process.

BACKGROUND

At present, in the mining industry, most underground mine construction areas are not suitable for large-scale mining machines to operate due to narrow environment spaces and rugged tunnel surfaces. Manual mining will consume a lot of labor force, and the operating efficiency is not high. Therefore, there appears small mining robots on the market, which can realize automatic recognition, movement and mining operations. However, the mining robots on the market are not accurate in recognizing the location of the ore, which will affect its mining operations.

SUMMARY

The present disclosure aims at providing a method and a device for acquiring three-dimensional coordinates of ore based on mining process to solve at least one of the technical problems existing in the prior art, which can accurately recognize a coordinate position of the ore and improve the mining efficiency.

A method for acquiring three-dimensional coordinates of ore based on mining process is provided in a first aspect of the present disclosure, including:

acquiring an ore image;

processing the ore image by using a YOLACT algorithm and a NMS algorithm to obtain a prediction mask map;

drawing a rectangular box according to the prediction mask map and obtaining a two-dimensional coordinate of ore through a center point of the rectangular box;

acquiring a color map and an infrared depth map;

transmitting the color map into a pre-training model for recognition to obtain object contours;

selecting a contour of a target object, calculating the sum of coordinates of X axis and Y axis of all points on the contour, and then dividing the sum of the coordinates by the number of the points on the contour to obtain a gravity center of the target object;

calculating a distance between the gravity center of the target object and the origin to obtain a polar coordinate of the target object, and aligning a center point of the color map and a center point of the infrared depth map through affine transformation to obtain a scale of the color map in the infrared depth map;

multiplying a length of the polar coordinate by the scale to obtain a point in the infrared depth map corresponding to a point in the color map, thereby obtaining depth information of the point in the infrared depth map; and combining the two-dimensional coordinate with the depth information to obtain a three-dimensional coordinate of the ore.

A device for acquiring three-dimensional coordinates of ore based on mining process is provided in a second aspect of the present disclosure, including:

a first image acquiring unit for acquiring an ore image;

a prediction mask map output unit for processing the ore image by using a YOLACT algorithm and a NMS algorithm to obtain a prediction mask map;

a two-dimensional coordinate output unit for drawing a rectangular box according to the prediction mask map and obtaining a two-dimensional coordinate of ore through a center point of the rectangular box;

a second image acquiring unit for acquiring a color map and an infrared depth map;

a contour output unit for transmitting the color map into a pre-training model for recognition to obtain object contours;

a gravity center output unit for selecting a contour of a target object, calculating the sum of coordinates of X axis and Y axis of all points on the contour, and then dividing the sum of the coordinates by the number of the points on the contour to obtain a gravity center of the target object;

an affine transformation unit for calculating a distance between the gravity center of the target object and the origin to obtain a polar coordinate of the target object, and aligning a center point of the color map and a center point of the infrared depth map through affine transformation to obtain a scale of the color map in the infrared depth map;

a depth information output unit for multiplying a length of the polar coordinate by the scale to obtain a point in the infrared depth map corresponding to a point in the color map, thereby obtaining depth information of the point in the infrared depth map; and a three-dimensional coordinate output unit for combining the two-dimensional coordinate with the depth information to obtain a three-dimensional coordinate of the ore.

An apparatus for acquiring three-dimensional coordinates of ore based on mining process is provided in a third aspect of the present disclosure, including: at least one control processor and a memory for communicating with the at least one control processor, wherein the memory stores instructions executable by the at least one control processor, and the instructions, when executed by the at least one control processor, cause the at least one control processor to perform the method for acquiring three-dimensional coordinates of ore based on mining process as described above.

A computer readable storage medium is provided in a fourth aspect of the present disclosure, wherein the computer readable storage medium has computer executable instructions stored thereon which, when executed by a computer, cause the computer to perform the method for acquiring three-dimensional coordinates of ore based on mining process as described above.

A computer program product is provided in a fifth aspect of the present disclosure, wherein the computer program product includes a computer program stored on a computer readable storage medium, the program product includes program instructions that, when executed by a computer, cause the computer to perform the method for acquiring three-dimensional coordinates of ore based on mining process as described above.

The method and device for acquiring three-dimensional coordinates of ore based on mining process in the present disclosure have at least the following beneficial effects: the present disclosure includes the following steps: acquiring an ore image; processing the ore image by using a YOLACT algorithm and a NMS algorithm to obtain a prediction mask map; drawing a rectangular box according to the prediction mask map and obtaining a two-dimensional coordinate of ore through a center point of the rectangular box; acquiring a color map and an infrared depth map; transmitting the color map into a pre-training model for recognition to obtain object contours; selecting a contour of a target object, calculating the sum of coordinates of X axis and Y axis of all points on the contour, and then dividing the sum of the coordinates by the number of the points on the contour to obtain a gravity center of the target object; calculating a distance between the gravity center of the target object and the origin to obtain a polar coordinate of the target object, and aligning a center point of the color map and a center point of the infrared depth map through affine transformation to obtain a scale of the color map in the infrared depth map; multiplying the length of the polar coordinate by the scale to obtain a point in the infrared depth map corresponding to a point in the color map, thereby obtaining depth information of the point in the infrared depth map; and combining the two-dimensional coordinate with the depth information to obtain a three-dimensional coordinate of the ore. According to the present disclosure, the two-dimensional coordinate is combined with the depth information to obtain the three-dimensional coordinate of the ore, so that the coordinate position of the ore can be recognized accurately and the mining efficiency is improved.

BRIEF DESCRIPTION OF THE DRAWINGS

The present disclosure is further described below with reference to the accompanying drawings and examples.

DETAILED DESCRIPTION

Specific embodiments of the present disclosure will be described in detail in this section. Preferred embodiments of the present disclosure are shown in the accompanying drawings which function to supplement the description of the written description with graphics, so that each technical feature and the overall technical solution of the present disclosure can be intuitively and vividly understood, but it cannot be construed as limiting the protection scope of the present disclosure.

In the description of the present disclosure, it should be understood that orientation descriptions involved, for example, orientation or position relationships indicated by up, down, front, back, left, right, and so on, are based on the orientation or position relationships shown in the accompanying drawings, and they are intended only to facilitate the description of the present disclosure and simplify the description, rather than indicating or implying that the device or elements referred to must have a specific orientation and be constructed and operated in a specific orientation, and thus cannot be understood as limiting the present disclosure.

In the description of the present disclosure, "several" means one or more, and "a plurality of" means more than two, "greater than, less than, more than, etc.," are understood as not including the number itself, while "above, below, within, etc.," are understood as including the number itself. It should be noted that the terms first and second are only used to distinguish technical features, and cannot be understood as indicating or implying relative importance or implicitly indicating the number of technical features indicated or implicitly indicating the precedence of the technical features indicated.

In the description of the present disclosure, unless otherwise clearly defined, the terms such as "arrange", "install" and "connect" shall be understood in a broad sense. A person skilled in the art can reasonably determine the specific meanings of the above terms in the present disclosure in combination with specific contents of the technical solution.

Figure 1:
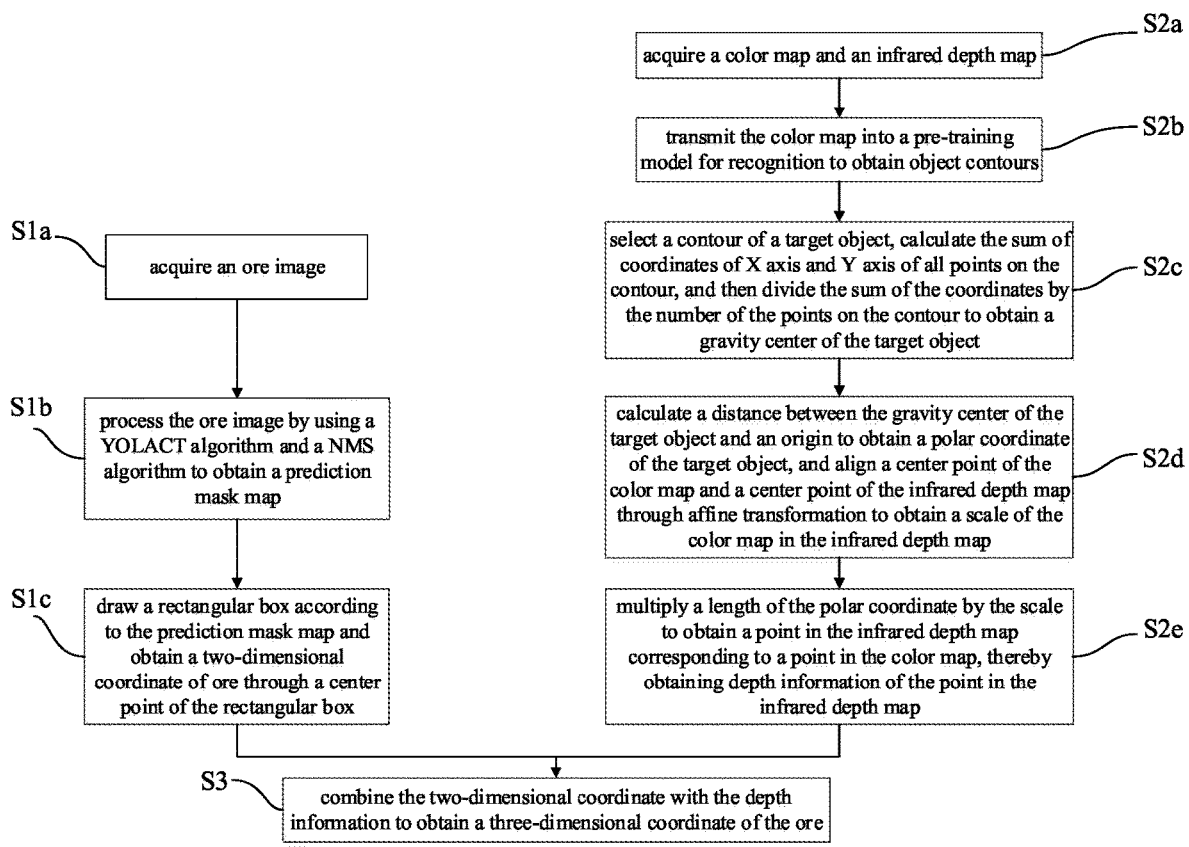
FIG. 1 is a flowchart of a method for acquiring three-dimensional coordinates of ore based on mining process according to an embodiment of the present disclosure.

Referring to FIG. 1, a method for acquiring three-dimensional coordinates of ore based on mining process is provided in a first aspect of the present disclosure, including the following steps.

In S1a, an ore image is acquired. When a mining robot reaches a mining target position, a depth camera is turned on to recognize the ore.

In S1b, the ore image is processed by using a YOLACT algorithm and a NMS algorithm to obtain a prediction mask map. A recognition algorithm uses a deep-learning-based YOLACT real-time instance segmentation algorithm to segment a collected ore image to generate high-quality masks. The YOLACT real-time segmentation algorithm aims at adding a human mask branch to an existing one-stage detector to achieve the purpose of instance segmentation, but it is not expected to refer to the feature location step in this process to improve the segmentation speed. A backbone monitor composed of a ResNet101 and a PFN (Feature Pyramid Network) is used to obtain a multi-scale feature map, which can generate higher-quality masks. To ensure the speed, two branch networks are designed to operate in parallel for Protonet and Predicition Head, respectively. The first branch uses FCN to generate a series of mask prototypes independent of a single instance. The second branch adds an additional header to the detection branch to predict a mask coefficient to encode the representation of an instance in a prototype mask space. After the steps of the NMS algorithm, a final prediction mask map is obtained by linear combination of output results of the two branches. Then a non-maximum suppression algorithm is used to select redundant boxes and find an optimal object detection position.

In S1c, a rectangular box is drawn according to the prediction mask map and a two-dimensional coordinate of ore is obtained through a center point of the rectangular box. A rectangular box is drawn based on the generated prediction mask map of ore, and a two-dimensional coordinate is obtained by calculating a center point of the rectangular box.

In S2a, a color map and an infrared depth map are acquired. The color map may be a three-channel color map.

In S2b, the color map is transmitted into a pre-training model for recognition to obtain object contours.

In S2c, a contour of a target object is selected, the sum of coordinates of X axis and Y axis of all points on the contour are calculated, and then the sum of the coordinates is divided by the number of the points on the contour to obtain a gravity center of the target object. The color map is transmitted into a pre-training model for recognition at first, and the pre-training model returns recognized contours and object labels of multiple objects in the image. Then, a contour of a target object label is selected. The sum of coordinates of X axis and Y axis of all points on the contour is calculated and then divided by the number of the points to obtain a gravity center of the object.

In S2d, a distance between the gravity center of the target object and the origin is calculated to obtain a polar coordinate of the target object, and a center point of the color map and a center point of the infrared depth map are aligned through affine transformation to obtain a scale of the color map in the infrared depth map. The distance between the gravity center of the target object and an origin is calculated by taking a positive X-axis direction as the positive direction and the center point of the image as the origin.

In S2e, the length of the polar coordinate is multiplied by the scale to obtain a point in the infrared depth map corresponding to a point in the color map, thereby obtaining depth information of the point in the infrared depth map.

The two-dimensional coordinate is combined with the depth information to obtain a three-dimensional coordinate of the ore.

In this embodiment, the two-dimensional coordinate is combined with the depth information to obtain a three-dimensional coordinate of the ore, so that the coordinate position of the ore can be recognized accurately and the mining efficiency is improved.

Figure 2:
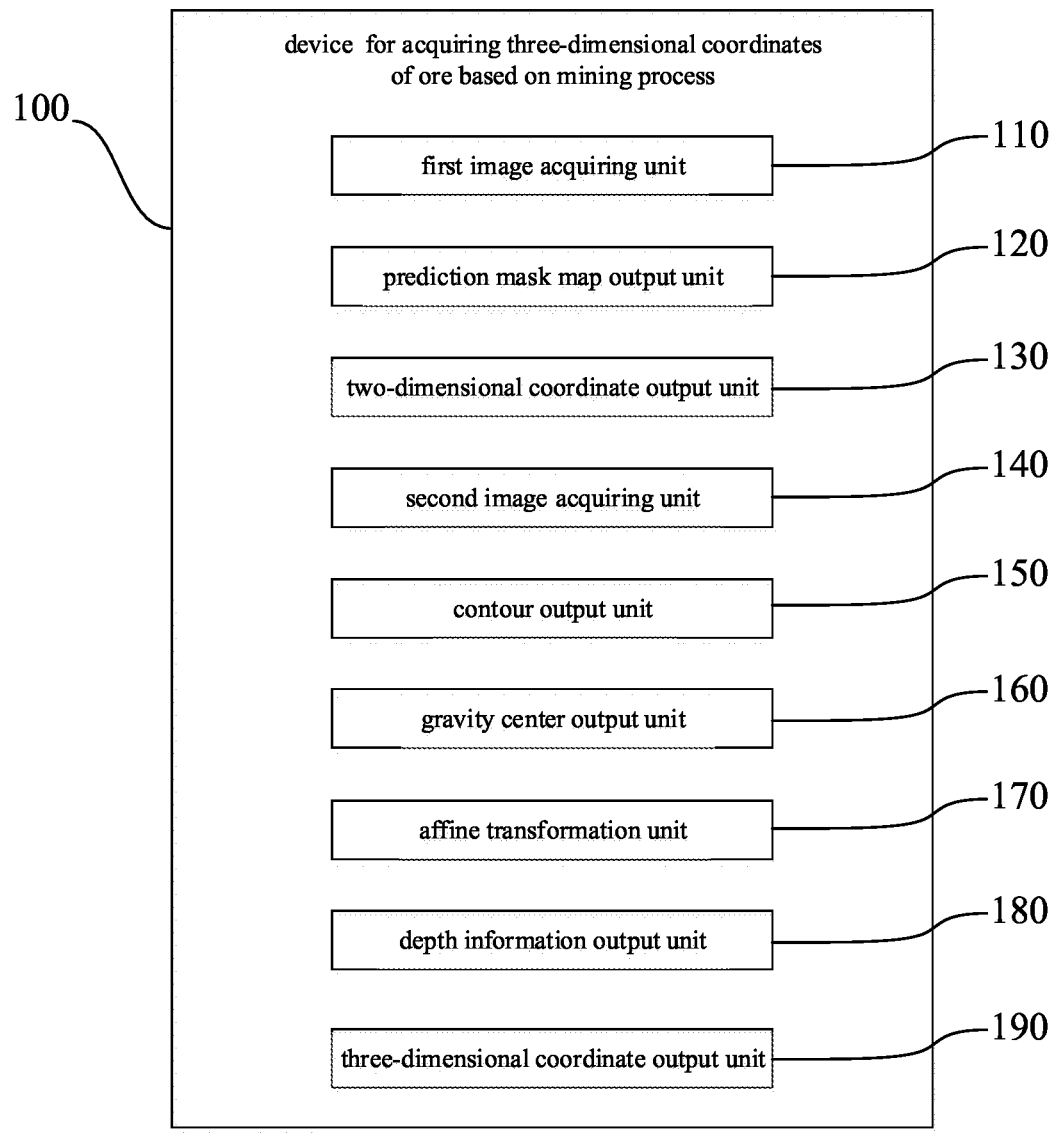
FIG. 2 is a schematic structural diagram of a device for acquiring three-dimensional coordinates of ore based on mining process according to an embodiment of the present disclosure.

Referring to FIG. 2, a device 100 for acquiring three-dimensional coordinates of ore based on mining process is provided in a second aspect of the present disclosure, including:

a first image acquiring unit 110 for acquiring an ore image;

a prediction mask map output unit 120 for processing the ore image by using a YOLACT algorithm and a NMS algorithm to obtain a prediction mask map;

a two-dimensional coordinate output unit 130 for drawing a rectangular box according to the prediction mask map and obtaining a two-dimensional coordinate of ore through a center point of the rectangular box;

a second image acquiring unit 140 for acquiring a color map and an infrared depth map;

a contour output unit 150 for transmitting the color map into a pre-training model for recognition to obtain object contours;

a gravity center output unit 160 for selecting a contour of a target object, calculating the sum of coordinates of X axis and Y axis of all points on the contour, and then dividing the sum of the coordinates by the number of the points on the contour to obtain a gravity center of the target object;

an affine transformation unit 170 for calculating a distance between the gravity center of the target object and the origin to obtain a polar coordinate of the target object, and aligning a center point of the color map and a center point of the infrared depth map through affine transformation to obtain a scale of the color map in the infrared depth map;

a depth information output unit 180 for multiplying the length of the polar coordinate by the scale to obtain a point in the infrared depth map corresponding to a point in the color map, thereby obtaining depth information of the point in the infrared depth map; and a three-dimensional coordinate output unit 190 for combining the two-dimensional coordinate with the depth information to obtain a three-dimensional coordinate of the ore.

It should be noted that since the device in this embodiment and the above method are based on the same inventive concept, the corresponding contents in the method embodiment are also applicable to the device embodiment, and will not be described in detail here.

Figure 3:
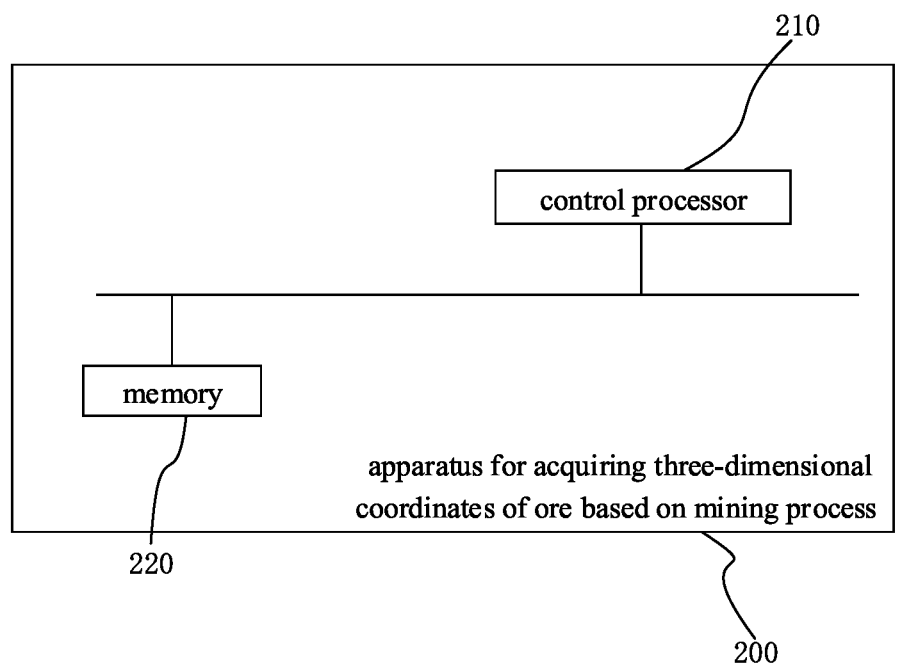
FIG. 3 is a schematic structural diagram of an apparatus for acquiring three-dimensional coordinates of ore based on mining process according to an embodiment of the present disclosure.

Referring to FIG. 3, an apparatus 200 for acquiring three-dimensional coordinates of ore based on mining process is provided in a third aspect of the present disclosure. The apparatus 200 may be any type of smart terminals, such as a mobile phone, a tablet computer, a personal computer, etc.

Specifically, the apparatus 200 includes: one or more control processors 210 and a memory 220. FIG. 3 shows an example of one control processor 210.

The control processor 210 and the memory 220 may be connected via a bus or in other manners. FIG. 3 shows an example of connection via a bus.

The memory 220, as a non-transitory computer readable storage medium, can be used for storing non-transitory software programs, non-transitory computer executable programs and modules, for example, program instructions/modules corresponding to the method for acquiring three-dimensional coordinates of ore based on mining process in the embodiment of the present disclosure, such as the units 100-190 shown in FIG. 2. The control processor 210 runs the non-transitory software programs, instructions and modules stored in the memory 220 to execute various functional applications and data processing of the device 100 for acquiring three-dimensional coordinates of ore based on mining process, that is, the method for acquiring three-dimensional coordinates of ore based on mining process in the above method embodiment is implemented.

The memory 220 may include a program storage area and a data storage area. The program storage area may store an operating system and an application required by at least one function. The data storage area may store data created according to use of the device 100 for acquiring three-dimensional coordinates of ore based on mining process. In addition, the memory 220 may include a high-speed random access memory 220, and may further include a non-transitory memory 220, for example, at least one disk storage device 220, a flash memory device, or other non-transitory solid-state storage devices 220. In some implementations, the memory 220 optionally includes a memories 220 remotely disposed relative to the control processor 210. The remote memories 220 can be connected to the apparatus 200 for acquiring three-dimensional coordinates of ore based on mining process via a network. Examples of the networks include, but are not limited to, the Internet, an Intranet, a LAN, a mobile communication network and combinations thereof.

The one or more modules are stored in the memory 220, and when they are executed by the one or more control processors 210, the method for acquiring three-dimensional coordinates of ore based on mining process in the above method embodiment is performed, for example, the steps S1a-S1c, S2a-S2e and S3 in the method of FIG. 1 described above are performed to implement the functions of the units 100-190 in FIG. 2.

A computer readable storage medium is provided in a fourth aspect of the present disclosure. The computer readable storage medium stores computer executable instructions which, when executed by the one or more control processors 210, for example, executed by the control processor 210 in FIG. 3, cause the one or more control processors 210 to perform the method for acquiring three-dimensional coordinates of ore based on mining process in the above method embodiment, for example, the steps S1a-S1c, S2a-S2e and S3 in the method of FIG. 1 described above, to implement the functions of the units 100-190 in FIG. 2.

The device embodiment described above is merely exemplary. The units described as separate parts may or may not be physically separate, that is, they may be located in one position, or may be distributed over multiple network units. Some or all of the modules may be selected according to actual needs to achieve the objective of the solution of this embodiment.

Through the above description of the implementations, it is apparent to a person skilled in the art that the implementations may be accomplished by software plus a universal hardware platform. A person skilled in the art should understand that all or a part of the method in the above embodiment may be implemented by a computer program instructing relevant hardware. The program may be stored in a computer readable storage medium. When the program is run, the process in the above method embodiment may be included. The storage medium may be a magnetic disk, an optical disc, a Read Only Memory (ROM), a Random Access Memory (RAM), or the like.

A computer program product is provided in a fifth aspect of the present disclosure, wherein the computer program product includes a computer program stored on a computer readable storage medium, the program product includes program instructions which, when executed by a computer, cause the computer to perform the method for acquiring three-dimensional coordinates of ore based on mining process as described above.

Embodiments of the present disclosure are described above in detail with reference to the accompanying drawings, but the present disclosure is not limited to the above embodiments. Various changes may also be made without departing from the purpose of the present disclosure within the knowledge possessed by a person skilled in the art.

We claim:

1. A method for acquiring three-dimensional coordinates of ore based on mining process, comprising:
    acquiring an ore image;
    processing the ore image by using a YOLACT algorithm and a NMS algorithm to obtain a prediction mask map;
    drawing a rectangular box according to the prediction mask map and obtaining a two-dimensional coordinate of ore through a center point of the rectangular box;
    acquiring a color map and an infrared depth map;
    transmitting the color map into a pre-training model for recognition to obtain object contours;
    selecting a contour of a target object, calculating the sum of coordinates of X axis and Y axis of all points on the contour, and then dividing the sum of the coordinates by the number of the points on the contour to obtain a gravity center of the target object;
    calculating a distance between the gravity center of the target object and an origin to obtain a polar coordinate of the target object, and aligning a center point of the color map and a center point of the infrared depth map through affine transformation to obtain a scale of the color map in the infrared depth map;
    multiplying a length of the polar coordinate by the scale to obtain a point in the infrared depth map corresponding to a point in the color map, thereby obtaining depth information of the point in the infrared depth map; and
    combining the two-dimensional coordinate with the depth information to obtain a three-dimensional coordinate of the ore.

2. An apparatus for acquiring three-dimensional coordinates of ore based on mining process, comprising: at least one control processor and a memory for communicating with the at least one control processor, wherein the memory stores instructions executable by the at least one control processor, and the instructions, when executed by the at least one control processor, cause the at least one control processor to perform steps of:
    acquiring an ore image;
    processing the ore image by using a YOLACT algorithm and a NMS algorithm to obtain a prediction mask map;
    drawing a rectangular box according to the prediction mask map and obtaining a two-dimensional coordinate of ore through a center point of the rectangular box;
    acquiring a color map and an infrared depth map;
    transmitting the color map into a pre-training model for recognition to obtain object contours;
    selecting a contour of a target object, calculating the sum of coordinates of X axis and Y axis of all points on the contour, and then dividing the sum of the coordinates by the number of the points on the contour to obtain a gravity center of the target object;
    calculating a distance between the gravity center of the target object and an origin to obtain a polar coordinate of the target object, and aligning a center point of the color map and a center point of the infrared depth map through affine transformation to obtain a scale of the color map in the infrared depth map;
    multiplying a length of the polar coordinate by the scale to obtain a point in the infrared depth map corresponding to a point in the color map, thereby obtaining depth information of the point in the infrared depth map; and
    combining the two-dimensional coordinate with the depth information to obtain a three-dimensional coordinate of the ore.

3. A computer readable storage medium having computer executable instructions stored thereon which, when executed by a computer, cause the computer to perform steps of:
    acquiring an ore image;
    processing the ore image by using a YOLACT algorithm and a NMS algorithm to obtain a prediction mask map;
    drawing a rectangular box according to the prediction mask map and obtaining a two-dimensional coordinate of ore through a center point of the rectangular box;
    acquiring a color map and an infrared depth map;
    transmitting the color map into a pre-training model for recognition to obtain object contours;
    selecting a contour of a target object, calculating the sum of coordinates of X axis and Y axis of all points on the contour, and then dividing the sum of the coordinates by the number of the points on the contour to obtain a gravity center of the target object;
    calculating a distance between the gravity center of the target object and an origin to obtain a polar coordinate of the target object, and aligning a center point of the color map and a center point of the infrared depth map through affine transformation to obtain a scale of the color map in the infrared depth map;
    multiplying a length of the polar coordinate by the scale to obtain a point in the infrared depth map corresponding to a point in the color map, thereby obtaining depth information of the point in the infrared depth map; and
    combining the two-dimensional coordinate with the depth information to obtain a three-dimensional coordinate of the ore.

* * * * *